Feb. 2, 1971   C. Z. BESSKO   3,560,846
MAGNETIC PROXIMITY DETECTOR
Filed Oct. 8, 1968

INVENTOR
CSABA Z. BESSKO

United States Patent Office 3,560,846
Patented Feb. 2, 1971

3,560,846
MAGNETIC PROXIMITY DETECTOR
Csaba Z. Bessko, 5806 Hobart St.,
Pittsburgh, Pa. 15217
Filed Oct. 8, 1968, Ser. No. 767,587
Int. Cl. G01r 33/00
U.S. Cl. 324—41                                                    1 Claim

ABSTRACT OF THE DISCLOSURE

A device for detecting objects of magnetic permeable material or external magnetic flux is provided wherein one or more flux sources have opposite poles shunted by a yoke, of high permeability, which is not placed in saturation solely by those flux sources. An external object or flux source can saturate the yoke with resulting force on the device or flux surrounding the saturated yoke may be picked up by a sensor. Where two flux sources are shunted by a yoke and an air gap is between the other set of poles, a flux sensor near the yoke responds only to flux (such as due to a ferrous object) that effectively shortens the air gap and exceeds that which saturates the yoke. The sharply saturable yoke gives the device definite pull-in and drop-out characteristics. The air gap configuration provides directional sensitivity.

---

This invention concerns a saturation controlled magnetic flux diode, hence called Reluctron, facilitating novel means in magnetic flux conditioning, magnetix flux sensing and reluctance operated proximity detection. Despite its apparent simplicity a practical reluctron could not have been made without the recent breakthrough in the development of uniform and stable soft and hard magnetic materials of the required characteristics.

Among the objects of the present invention are to provide improved magnetic detection apparatus and the like, to provide a detector for magnetic permeable objects or external magnetic flux that has a consistent pull-in, drop-out ratio, and to provide such a detector that may be given a high degree of directional sensitivity.

The above and other objects and advantages are achieved in a device that utilizes the sharply saturable characteristics of a yoke of soft magnetic material with one or more flux sources (e.g., permanent magnets or electric current-carrying coils) that by themselves are not quite sufficient to saturate the yoke. An external flux source or body of permeable material saturates the yoke with a detectable effect, e.g., flux surrounding the saturated yoke may be picked up by a nearby sensor.

Of particular interest is a form of the invention wherein a pair of flux sources have one set of opposite poles shunted by such a yoke and the other set of poles define an air gap. A flux sensor, such as a reed switch or magnetic flux sensitive semiconductor device, near the yoke responds only to flux that effectively shortens the air gap and exceeds that which saturates the yoke such as would be caused by a ferrous object. The sharply saturable yoke gives the device definite pull-in and drop-out characteristics and the air gap configuration provides directional sensitivity.

Certain aspects of the operation of devices in accordance with this invention can be analogized with those of a current rectifying diode, as will be described hereinafter. The coined term "reluctron" is sometimes used herein to designate devices in accordance with certain aspects of the invention.

Figure 1:
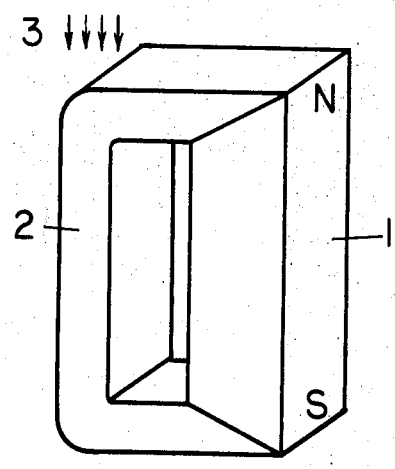
Figure 2:
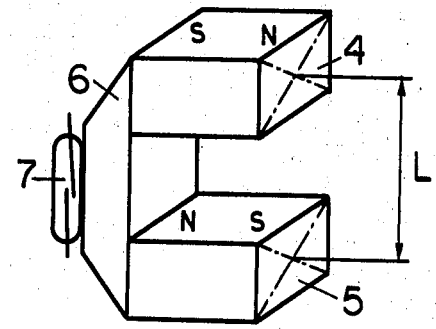
Figure 3:
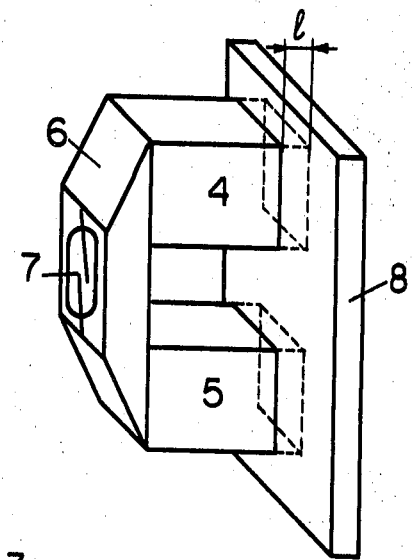

The invention will be better understood by referring to the following description, taken with the accompanying drawing wherein:

FIGS. 1, 2 and 3 are perspective views of various embodiments of the present invention.

The basic property of the reluctron is that when it is placed in magnetic flux it represents a low reluctance path in one direction and a high reluctance path in the opposite direction. This is analogous to a current rectifying diode in an electrical circuit. The force acting on a reluctron is proportional to the amount of external flux carried by the reluctron. This involves for instance, unidirectional motion of a reluctron in an alternating (AC) magnetic field.

In its simplest form the reluctron consists of magnetic flux source 1 and saturable soft iron yoke 2 as they are marked in FIG. 1. Flux source 1 is constructed from an electric current-carrying coil or a permanent magnet and the magnetic permeability of the flux source must be much smaller than that of the saturable yoke. When there is no considerable air gap in its internal flux source, the reluctron does not generate any external magnetic field therefore it is magnetically neutral. For the sake of simplicity let us suppose that a permanent magnet is applied as flux source and after magnetization of the reluctron assembly in the shown North-South direction in FIG. 1 yoke 2 is not saturated. Assuming that the direction of flux lines in yoke 2 is from North to South, a certain amount of external flux 3 is necessary to fully saturate the soft iron yoke say in the positive section of its hysteresis curve. After the yoke is saturated its permeability becomes equal to that of the air. If the amount of external flux of former direction 3 is increased it can be done against the large demagnetizing effect of the saturated reluctron, which now acts as a virtual air gap of the same length as the saturated yoke. For external flux lines opposite to direction 3 the reluctron acts as a low reluctance magnetic short circuit until the yoke reaches its saturation limit but now in the negative section of its hysteresis curve.

Further increase of the flux is possible only against the virtual air gap mentioned earlier. In other words the reluctron acts as a constant flux source similar to a constant current source in an electrical circuit. The force acting on a given reluctron is highest when the yoke is in negative saturation assuming a homogenous external magnetix field.

After the removal of external flux the reluctron regains its static state where the yoke is slightly below positive saturation.

Let us consider a reluctron with a certain length of static air gap in its internal flux source. By varying the effective length of the static air gap by inserting magnetically permeable material or external magnetic flux a remarkable reluctive transducer and/or magnetic flux detecting device can be constructed with far superior stability and directional sensitivity than performed by other such devices presently known.

A recent review of reluctive transducers is given in an article by R. G. Donovan, AEI Engineering, v. 7, No. 3, 1967, entitled "Magnetic Switching Devices Incorporating Dry Reed Contact"; also in "Proximity Switch Instruction Manual F–1," File No. 5B, pages 1–8/9, 2–17–2–20, published by Micro Switch, Freeport, Ill.; and in U.S. Pats. No. 2,876,415; 3,022,398; and 3,040,247. A common feature of these transducers is that the presence of detectable ferrous material shunts the magnetic field produced by the transducer and causes a general decrease in flux density which is indicated by a flux-sensing device located at some distance from the internal flux source. The flux-sensing device is usually a reed switch, flux-sensitive semiconductor, etc.

My reluctive transducer, comprising a reluctron formerly described, produces a general increase of flux when the presence of detectable ferrous material shunts the magnetic field produced by the transducer itself. This positive incremental flux is then sensed by any of the above mentioned flux sensing devices. An example of the construction of my saturation controlled reluctive transducer is shown in FIG. 2.

Again for the sake of simplicity let us assume that the gap-divided internal magnetic flux sources 4 and 5 are permanent magnets and flux sensing device 7 is a reed switch. The magnets are magnetized as shown in FIG. 2 and shunted at one end by soft iron saturable yoke 6. The cross section of yoke 6 is chosen that it is below saturation when no external ferrous material or external magnetic flux is present and when the length of the static air gap is L. Flux-sensing device 7 is located in an air gap between the shunted ends of flux sources 4 and 5 near or inside the saturable yoke. In spite of the considerable amount of static flux contained in the yoke due to the relatively high permeability of the yoke before its saturation no flux line reaches sensor 7 until the yoke is saturated due to an increased overall internal flux of flux sources 4 and 5. The increase of overall internal flux is achieved by reducing static air gap L to $2 \times l$ as indicated for the ferrous surface detector shown as one of the possible applications of my reluctive transducer in FIG. 3.

An effective air gap $2 \times l$ results by partial shunting L with ferrous material 8 and/or by applying an external magnet flux which helps the saturation of the yoke of the reluctron. One part of the increased flux first fully saturates the yoke, then the rest of the flux is conducted to the flux sensor for switching or for continuous measurement. The process is reversible and by removing effective air gap $2 \times l$ and reestablishing static air gap L the yoke regains its former unsaturated state. Since the yoke saturates sharply a very definite pull-in, drop-out ratio results and the transducer can be, for example, used as a proximity limit switch. The directional sensitivity of this new transducer is ensured by generating the internal magnetic field only along static air gap L and keeping the other ends of the magnets shunted with the high permeability yoke thus minimizing stray flux in this area. The wall thickness of a protective casing (not shown) of the transducer can be sufficient to nullify the effect of any ferrous mass outside the protective casing.

Some significant features of the invention are:

A saturation-controlled magnetic flux diode (called "Reluctron") is provided that comprises an internal magnetic flux source shunted by a temperature-compensated saturable soft iron yoke which is exposed to the external magnetic field to be rectified. The yoke is in near saturated state when no external magnetic field or considerable low reluctance path is present in the vicinity of the reluctron.

When an external magnetic field enhances the saturation of the yoke it becomes fully saturated and its incremental permeability becomes practically zero. When the external flux opposes the flux in the yoke, the yoke provides a low reluctance magnetic path until it becomes saturated in the opposite direction due to the increasing external magnetic field. The reluctron performs unidirectional motion in a limited strength alternating (AC) magnetic field.

The shape and length of the saturable yoke is governed by the needs of an actual installation as long as the yoke is near saturation when no external magnetic flux is present.

The permeability of internal flux source is negligible compared to the permeability of the saturable yoke.

A reluctron with considerable static air gap in its internal flux source is able to fully saturate its yoke if the static air gap is replaced by an effective air gap shorter than the static air gap as a result of fully or partially shunting the static air gap by an external magnetically permeable material.

A reluctance and/or flux detecting device can comprise a reluctron as described above and one or more flux-sensitive sensors indicating the presence of incremental magnetic flux in the vicinity of the yoke of the reluctron.

The detecting device is operated by varying the effective air gap in the flux source of the reluctron or by applying an external flux of the direction which enhances the saturation of the yoke of said reluctron. The detecting device sums all external effects which are expressed in the length of the effective air gap. The effective air gap is produced by external magnetically permeable material and by external magnetic flux.

The device features a marked directional sensitivity and operates on external magnetic flux or detectable materials approaching the sensing face within the designed sensitivity of operation.

The saturation properties of the soft iron yoke are matched to the flux generating properties of the internal and/or external flux sources, and detectable materials throughout a required temperature range by constructing the yoke from several irons with different temperature saturation characteristics.

The shape, length, relative position of the gapped internal flux source, yoke and incremental flux sensor, as well as the error of the temperature compensation are determined by the required size, shape and sensitivity of the detecting device.

I claim:

1. A magnetic proximity detector comprising: a pair of permanent magnets; a yoke of magnetizable material of high permeability compared to that of said permanent magnets, said yoke shunting the North pole of one magnet to the South pole of the other magnet; the remaining poles of said permanent magnets defining an air gap normally free of any objects of magnetic permeable material and having a normal length equal to the distance between the centers of said poles; the magnetic flux of said permanent magnets normally being insufficient to saturate said yoke in the absence of magnetic material proximate to said air gap; a magnetic flux-sensitive switch mounted adjacent said yoke and positioned on the side of said yoke opposite said permanent magnets and being thereby shielded from the flux of said magnets in the absence of magnetic material proximate to said air gap, whereby when an object of permeable material comes into proximity with said air gap, the flux from said magnets saturates said yoke and the excess flux actuates said magnetic flux-sensitive switch.

References Cited

UNITED STATES PATENTS

| | | | |
|---|---|---|---|
| 2,641,697 | 6/1953 | Schurr | 340—258UX |
| 3,253,099 | 5/1966 | Hess | 324—41UX |
| 3,315,204 | 4/1967 | Weiss | 324—46X |
| 3,161,387 | 12/1964 | Jutier | 324—41 |
| 3,188,427 | 6/1965 | Cooper et al. | 335—204 |

FOREIGN PATENTS

| | | | |
|---|---|---|---|
| 1,087,727 | 11/1953 | France | 340—258 |

OTHER REFERENCES

Cuzner et al.: Mechanically-Actuated Magnetic Switch; I.B.M. Technical Disclosure Bulletin; vol. 11, No. 3, August 1968, p. 346.

RUDOLPH V. ROLINEC, Primary Examiner

R. J. CORCORAN, Assistant Examiner

U.S. Cl. X.R.

324—43; 335—205, 207; 340—38